July 23, 1957     J. C. SHEPHERD     2,800,455

METHOD OF PRODUCING GEL REFRIGERANT

Filed June 22, 1953     5 Sheets-Sheet 4

INVENTOR.
JOHN C. SHEPHERD
BY A. Dunham Owen

ATTORNEY

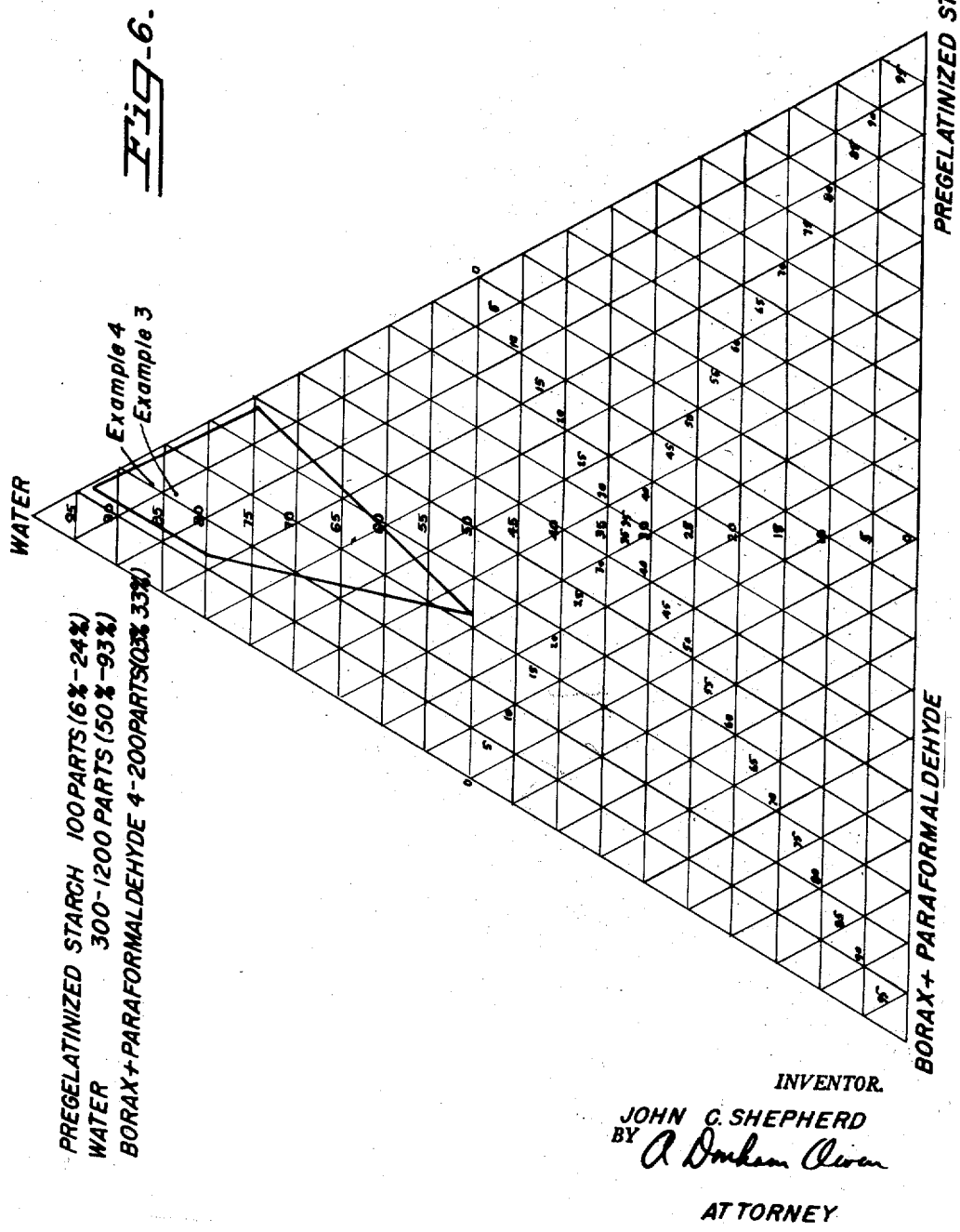

United States Patent Office 2,800,455
Patented July 23, 1957

2,800,455

METHOD OF PRODUCING GEL REFRIGERANT

John C. Shepherd, Monrovia, Calif.

Application June 22, 1953, Serial No. 363,186

4 Claims. (Cl. 252—70)

This invention relates to an improved gel refrigerant which does not liquefy at ordinary room temperatures. More particularly it relates to a method for manufacturing the new gel refrigerant. This application is a continuation-in-part of application Serial Number 217,811, filed March 27, 1951, now abandoned.

For many purposes water ice is an undesirable refrigerant solely because it melts into water at the comparatively low temperature of 32° F. Once it turns to water, it flows away from the goods so that it is no longer present to refrigerant them; still worse, it often spoils the goods being refrigerated and damages or destroys the shipping container in which the goods were packed. Except for this property of melting, water ice is an excellent refrigerant, because it has a very high specific heat and a very high heat of fusion.

I have solved the problem caused by the melting of water ice and have devised a refrigerant that incorporates water along with its attendant advantages, but does not liquefy when its temperature exceeds its "freezing" or "fusion" or "eutectic" point; i. e. that temperature where a quantity of heat energy is transferred without any resultant change in temperature, due to a "change of state." The quantity of heat consumed during this change in state is commonly known as the "heat of fusion."

My refrigerant is a new type of starch gel that contains, in addition to water and starch, other ingredients that cause it to have properties not found in prior gels. The gels heretofore known were in some manner affected by freezing, so that they leaked or ran water when the temperature was again raised. Such prior art gel refrigerants as the one shown in Gilchrist's United States Patent No. 2,490,047 were called "slow melting ices," and because they did melt, they did not solve the problem. My gel refrigerant holds the water and does not melt or run water after it has been frozen and then raised to room temperature or even to higher temperatures.

The moisture in my improved refrigerant may be sufficient to prevent dehydration of a surface with which it is in contact, so that it is well adapted to preserve perishable commodities. Moreover, it differs from prior art refrigerant materials in that it may be molded around a commodity before it is frozen, i. e., somewhat like molding clay. This enables it to protect the commodity from dehydration when both are frozen, and during any period they may be held in cold storage.

Another advantage possessed by my new refrigerant and not by prior art gels is that when it is frozen, it may be shaved or cut into small pieces like crushed water ice. This makes it easy to pack, easy to convey through conduits, and also makes possible its all-round efficient use as a refrigerant. This gel ice will not give up its water when it warms up to ordinary room temperature. Instead, the small pieces of gel that come in contact tend to reform together into a mass and may be again handled in large pieces.

My new gel refrigerant may be treated so as to last indefinitely, or it may be treated so that, after a suitable period of time, it will melt or liquefy. With the latter type of treatment the used material may be placed at the intake end of a sewage system and it will dispose of itself.

The composition of my gel refrigerant may be varied in its manufacture to give it different "freezing points," so that its properties can be adapted to a particular use. Characteristics such as point of fusion, heat of fusion, and toughness may be affected and adjusted to the most desirable temperature range for the material being refrigerated.

Other objects and advantages of the invention will become apparent from the following detailed description thereof, including several examples of formulas and several examples of ways in which the gel refrigerant may be used. The formulas and uses are, however, only examples, and are not to be thought of as narrowly limiting the invention beyond the scope of the appended claims.

In the drawings:

Fig. 6 is a graph illustrating the proportions of starch, water and the combination of borax and paraformaldehyde which may be used in the present invention.

Figure 1:
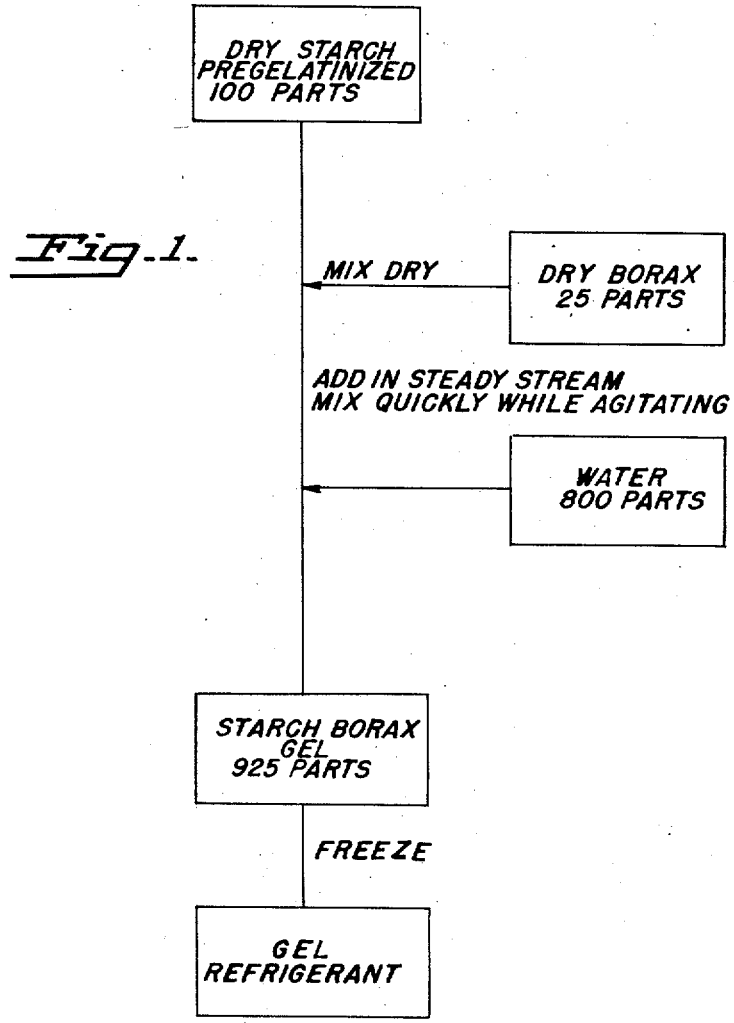
Fig. 1 is a flow sheet diagrammatically illustrating one process of manufacture of the refrigerant discussed in Example 1 below.

Before discussing any particular examples, let me first explain what I mean by a "gel." One text defines gel as "a mixture, one component of which is a fluid, homogeneous down to colloidal dimensions, capable of resisting a finite shearing force." (Industrial Chemistry of Colloidal and Amorphous Materials, by Lewis, Squires, and Broughton, Macmillan, New York, 1942, page 225.) My gel refrigerant appears to come under this definition.

The same text says (page 219) ". . . The characteristics of jellies have long been a subject of study and dispute." For that reason, I shall not attempt to advance any theoretical explanation of what makes my substance work. I have discovered that it does work, and I have discovered the ingredients, proportions, and processing that produce a satisfactory gel, and that enables manipulation of its qualities. So far as theory is concerned, the same text says (page 229): "The only tenable explanation of the properties of gels in general seems to be the assumption of a card-house or brush-heap structure of solid or quasi-solid particles immersed in the fluid, the particles being bonded at points of contact sufficiently to prevent disintegration of the structure. The particles of the framework may be suspended solids of colloidal dimensions, or long, inter-tangled molecular chains, or in limiting cases, even emulsified droplets. The bonds at points of contact may be due in some cases to nothing more than interparticle friction, while in others the forces are undoubtedly of the partial valence or the primary valence types. Despite the diversities in properties resulting from these possible differences in structure, it is felt that the picture here outlined gives the most satisfactory insight today available into the behavior of gels."

A gel is unlike other substances in that it does not change from a solid to a liquid at the point of fusion. Instead it changes from a semi-solid or flexible solid to a true or rigid solid.

My gel-refrigerant is a semi-solid or flexible solid at room temperatures, with its physical appearance superficially resembling gelatine desserts and fruit jellies, and it can then be bent, moulded and reshaped. When it is frozen into a solid, it is as stiff as ice, though somewhat less brittle, and it will ring when struck sharply with a hammer. When gel in the semi-solid state is similarly struck, the sound is a plunk or thump somewhat like sound given by a melon, even if there is a stiff crust of solid gel around the outside. The striking is therefore a good test of the state of the gel.

Not all gels will usefully make said refrigerants and most gels will leak water after they have been frozen and cooled. A present invention has solved the problem of providing a gel refrigerant which can be used satisfactorily without leaking water, and, which in certain forms, can be used repeatedly over a long period of time being refrozen and rethawed without leaking water.

THE GEL REFRIGERANT BROADLY CONSIDERED

The product of this invention, which is disclosed and claimed in my co-pending application, S. N. 363,155, filed June 22, 1953, entitled Gel Refrigerant and a Method of Making Same, is a starch-borax gel lying within a certain range of proportions. It may contain only pregelatinized starch, borax, and water or it may have other ingredients which vary the properties of the gel.

Any suitable pregelatinized starch may be used, including corn starch, potato starch, and wheat starch. The product produced by using ungelatinized or pregelatinized starch and the method or process for producing such product by using ungelatinized starch are described and claimed in my co-pending application, Serial No. 363,155, filed June 22, 1953, above identified, and since the manufacturing processes or methods of producing the product are different this application relates solely to the method or process for producing the product from pregelatinized starch.

Pregelatinized starch can be mixed with water at room temperature; whereas ungelatinized starch must be heated in water above the gelatinization point of the starch used, which is usually 160° F. to 200° F.; then it must be cooled before it is handled.

In pregelatinized starch, the characteristics of the gel-refrigerant depend somewhat on the original gelatinization, because gels exhibit the phenomenon of "memory." Apparently the "card-house" or "brush-heap" structure referred to above in the text quotation has something to do with this. At any rate, the amount of water needed will depend on the original constitution of the pregelatinized starch, and so there will be inevitable variations of the formula. However, my gel refrigerant will give satisfactory results so long as it is adapted to the materials being used.

The ratio of starch to water is important for the properties of the gel can be varied by varying this ratio. It depends partly on the original processing, but there are other factors, too. In Examples 1 to 3 below, the ratio is 1 part of starch to 8 parts of water. This ratio has been set forth as an illustration of a ratio which will prevent water from running off when the refrigerant is subjected to all the extreme treatments involved in handling many times: e. g., freezing, cutting or grinding, thawing, raising to high temperatures, and in some cases refreezing, with the whole process repeated over again. Should more favorable conditions be encountered or should a thinner material be desirable, then the ratio may be increased to 1 part of starch to about 12 parts of water. On the other hand, if the material is too soft or if its yield point is too low, then a higher ratio of starch to water will give a stronger material, but will reduce the specific heat and the heat of fusion.

Two or more kinds of starches may be mixed together, and sometimes this will affect the ratio of starch to water. For example, suppose that half the starch in the gel is pregelatinized cornstarch and the other half is pregelatinized wheat starch. Typical pregelatinized cornstarch calls for a ratio of about 1 to 8. Pregelatinized wheat starch may call for a 1 to 6 ratio. A gel made up as a mixture of the two will hold water at about a 1 to 7 ratio.

THE IMPORTANCE OF BORAX

Due to the inclusion of borax into the mixture, this refrigerant will not melt when it is unfrozen and heated to room temperatures, but will remain in the semi-solid state for a predetermined period of time. The borax apparently performs three functions:

(1) It causes the mixture to set faster and to a more rigid consistency on a smaller amount of starch per water, thus making it possible to get a higher specific heat and heat of fusion. Only a small amount of borax is needed to get this effect, and in Example 1 this particular effect can be obtained with only a fourth of the amount specified.

(2) The addition of a large quantity of borax apparently prevents the breakdown that ordinarily resulted when prior art gels were frozen and then unfrozen. When thawed they became spongy and melted or leaked water. Should the borax be omitted from the formula in Example 1, a gel will still form and it can be frozen, but when it is again heated above the freezing point, about half its water may be readily squeezed out. When borax is used as specified, no water will run out, nor can any be squeezed out after the gel has been returned to room temperature. If a small amount of leakage is not undesirable or if the material is not subject to being squeezed on returning to room temperature, the amount of borax specified in Example 1 may be reduced by about a half.

(3) After starch gel becomes warm, it tends to break down into a slimy liquid, probably a sol. This is not mere leaking or loss of water, it is a rupture of the gel state. The addition of borax alone will not prevent this breakdown, but it will delay it, so that it may take place only after a substantial and fairly predictable period of time. When the amount of borax specified in Example 1 is used, the mixture will remain in its semi-solid state for about four days after it has become warm, long enough for most shipments. If only half the amount specified in Example 1 is used, the breakdown will begin after about thirty-six hours. If twice the amount specified in Example 1 is used, the breakdown will not begin until after about six to eight days, under average conditions. In any event, when the mixture has served its purpose, it may be thrown into a suitable container with an outlet into a sewage system. The gel gradually dissipates into a slimy liquid that runs off into the sewage.

If a permanent gel is wanted, formaldehyde should be added, as in Examples 3 and 4 below. Then the gel may be made to last indefinitely, but it cannot be disposed of so easily.

INGREDIENTS AFFECTING THE FREEZING POINT

Sodium chloride, other salts, and other substances may be used to change the freezing point of the gel refrigerant. The refrigeration expert knows the different substances that will do this and how they act. In Example 5, one such mixture is shown in detail. Examples could be multiplied, but this illustrates that the freezing point of the gel can be considerably varied by the addition of various other ingredients.

Specific examples of starch-borax gels and their applications will now be considered.

Example 1.—A starch-borax gel refrigerant

Pregelatinized starch (e. g., "Amijel"), 100 parts
Borax, 25 parts by weight
Water, 800 parts by weight (at room temperature)

One process of compounding the refrigerant of Example 1 is illustrated diagrammatically by the flow sheet of Fig. 1. In this process the powdered starch and powdered borax are mixed together thoroughly in the dry state. The dry mixture is then added to the water quickly and in a steady stream while the water is agitated, so that a uniform mixture is obtained before gelatinization sets in. The mixture starts to thicken almost immediately, and in a few minutes it sets to a pliable semi-solid mass.

Figure 2:
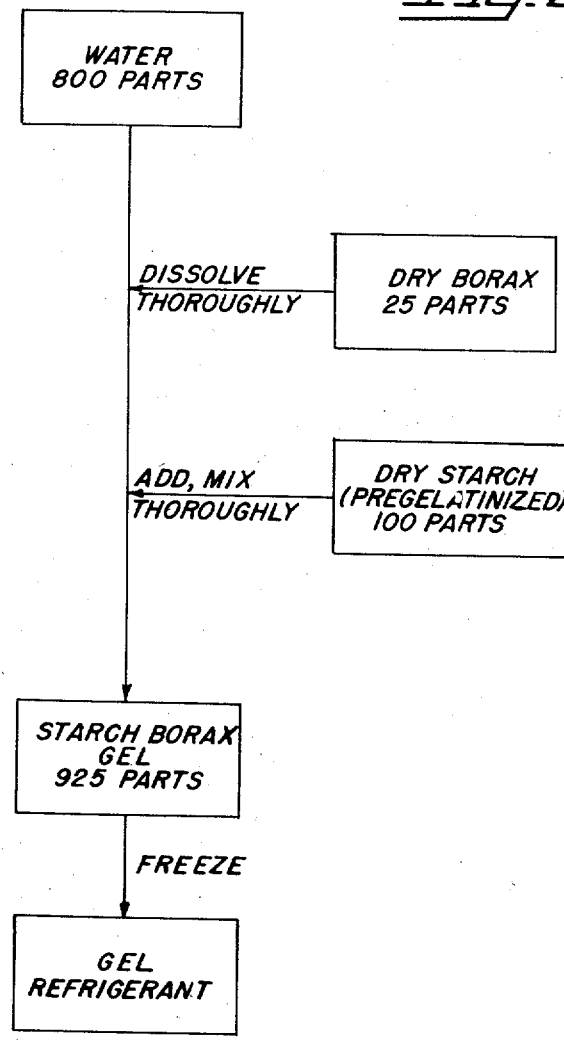
Fig. 2 is a flow sheet diagrammatically illustrating an alternate process of manufacturing a refrigerant as in Example 1.
Figure 3:
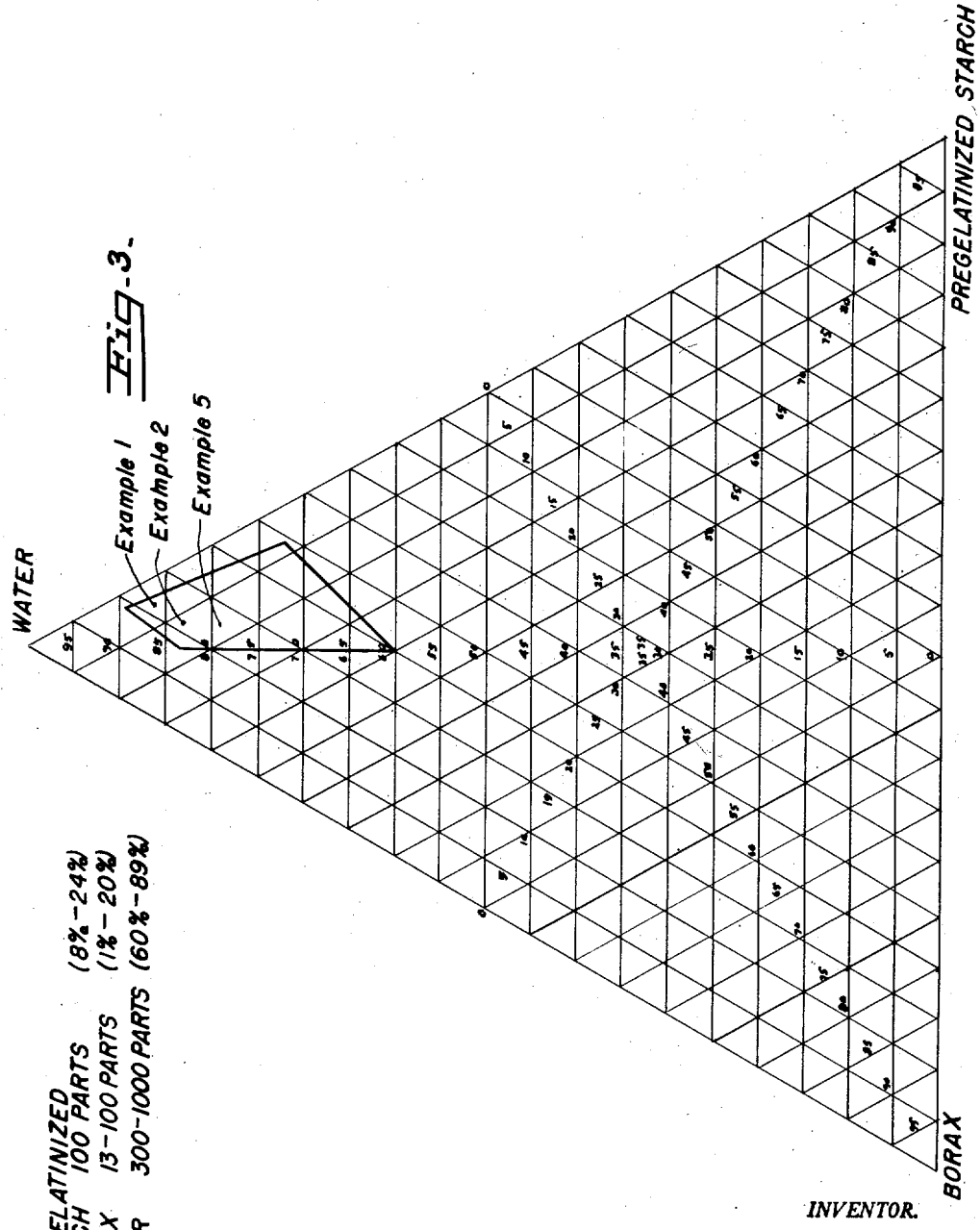
Fig. 3 is a graph illustrating the range of values of starch, water and borax that may be used in this invention.

Another way of making the refrigerant of Example 1 is shown in Fig. 2. Here, the borax is dissolved in the water first. Then the starch is added and agitated. The final results are almost identical to those given with the process shown in Fig. 1.

Once jelled, the mixture may be removed from the mixing container by turning the container over and shaking or tapping it. The gel will fall away from the walls of the container and slip out. The mixture may also be removed by a shovel or other suitable implement or with the hands.

The semi-solid gel may then be placed under suitable refrigeration in a single large mass, in chunks, or in a suitable container such as the tapered ice cans used in water-ice plants. The mixture of Example 1 will solidify at approximately 30° F. Care should be taken to be sure the material is completely frozen. Its appearance and feel are sometimes deceiving, because it may appear to be solid when only its outer surface is frozen and the interior is still semi-solid. A good test is to strike the material a sharp blow with a hammer; if the mixture is solid, the blow will cause a ringing sound. If there is no ring, the sound will resemble a thump on a melon, and this means that the gel is not completely frozen.

The gel refrigerant of Example 1 has a specific heat of about .90 and a heat of fusion of about 125. Therefore, starting with the material at 70° F., approximately 161 B. t. u. per pound must be removed to freeze it. This compares with a removal of about 183 B. t. u. per pound to cool water from 70° F. to 30° F., including freezing it.

Example 2

In some instances (e. g., such as in Example 8 below) it may be desirable to refreeze my gel refrigerant many times. The following formula is suitable for such use:

| | Parts by weight |
|---|---|
| Pregelatinized starch (e. g. "Amijel") | 100 |
| Borax | 60 |
| Water | 800 |

This mixture may be made by either of the methods described in Example 1. The gel refrigerant will perform similarly, except it may be refrozen more times. Its specific heat is approximately .88 and its heat of fusion approximately 120.

Example 3.—A longer lasting gel

The lasting properties of the gel refrigerant, i. e. the factor that keep it from melting or turning to the slimy liquid mentioned in above paragraph 3, in the section called "The Importance of Borax," may be enhanced by the addition of formaldehyde or some other aldehyde. For instance, the addition to Example 2 of about one part of formaldehyde to the water before the starch is added will keep the change from taking place for periods of 1000 hours or longer after the gel thaws to its semi-solid state. The addition of a greater amount of formaldehyde may prevent the rupture of the gel state from ever occurring, as in the following example.

Example 4.—A permanent gel

For many uses the composition of Example 1, 2 or 3 may be ideal. However, a relatively permanent gel-refrigerant may be made by the following formula:

| | Parts by weight |
|---|---|
| Pregelatinized starch (e. g. "Amijel") | 100 |
| Borax | 25 |
| Paraformaldehyde | 3 |
| Water | 800 |

Where the material is to be frozen quickly and thawed quickly and where no aldehyde is to be used, the range of proportions may be as follows:

Pregelatinized starch ____ 100 parts.
Water _____ Between 300 and 1,000 parts.
Borax _____ Between 13 and 100 parts.

Expressed percentage-wise, this means that the gel refrigerant consists substantially of between about 8% and 24% pregelatinized starch, between about 3% and 20% borax, and the remainder of water.

Where an aldehyde is used in a mixture that is frozen quickly, the range of values may be as follows:

| | Parts |
|---|---|
| Pregelatinized starch | 100 |
| Water | 300 to 1200 |
| Borax | 3 to 100 |
| Paraformaldehyde | 1 to 100 |

Expressed percentage-wise, this means that the gel refrigerant consists essentially of between about 7% and 25% of pregelatinized starch, between about .3% and 20% borax, between about 0.1% and 20% of paraformaldehyde and the remainder of water.

Where the freezing is done more slowly, the range of usable preparations is smaller, for there is a greater tendency to leak water. The following values may be used:

Pregelatinized starch _____ 100 parts.
Water _____ Between 300 and 900 parts.
Borax _____ Between 13 and 100 parts.

When an aldehyde is used, the range of values is as follows:

| | Parts |
|---|---|
| Pregelatinized starch | 100 |
| Water | 300 to 1000 |
| Borax | 5 to 100 |
| Paraformaldehyde | 1 to 100 |

Example 5.—A gel refrigerant with a lower freezing point

Sometimes it is desirable to have the "freezing" or "eutectic" point of the gel refrigerant lowered. The following formula is illustrative.

| | Parts by weight |
|---|---|
| Pregelatinized starch ("Amijel") | 100 |
| Borax | 60 |
| Sodium chloride | 120 |
| Water | 600 |

The sodium chloride may be added to either the starch or the water, so long as it is well mixed in. Then the mixture is prepared and processed according to either of the methods set forth in Example 1. The liquid part of this mixture in combination with the sodium chloride takes on the freezing characteristic of a brine solution, with a freezing point for the mixture of about −6° to about −10° or even lower.

Sodium chloride may also be added to the formaldehyde mixture of Example 4, preferably reducing the amount of water in order to get characteristics like those of Example 5.

In place of sodium chloride, other substances may be used, so long as they are soluble, do not react with the starch, are not volatile, and are not destroyed by the heating necessary when mixing the ungelatinized starch. For example: Calcium chloride, sodium sulfate, potassium nitrate, potassium chloride, sodium carbonate and other soluble metallic salts may be used as may other well-known eutectic depressants. The metallic salt or depressants may be added to the starch-borax gel of Example 1 as well as to the gel which included the formaldehyde. The amount of such matter to be added depends upon its solubility and upon the desired eutectic point, but extends from zero to saturation.

The formulas set forth in Examples 1 to 5 will not melt at temperatures under 100° F. and they may be used for most applications up to 120° F. They do not melt until much higher temperatures are reached, but they may get sticky at temperatures much above 120° F.

The following examples are applications of some of the above formulas:

*Example 6.—Preventing frozen food from degenerating*

My invention may be used in many applications where regular water ice and the other refrigerants heretofore known cannot be used. For example, it may be used to keep frozen food from degenerating.

Each time frozen food is handled—whether by the producer, the warehouse, the distributor, or the ultimate consumer—it is subjected to temperatures higher than the optimum level, and it is subjected to a fluctuation in temperature. Such fluctuation causes deterioration of the food, whenever it rises above a certain temperature, whether or not the food completely thaws out, because large ice crystals build up that eventually rupture the cell walls of the food product. As a result, the food may become undesirably soft, and the package may even drip water.

Figure 4:
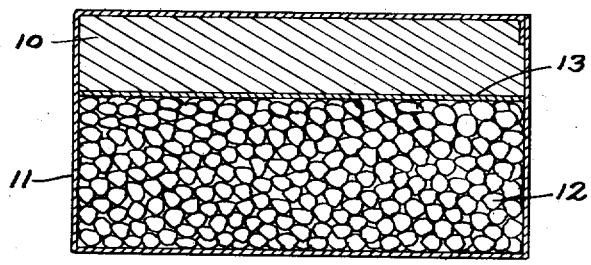
Fig. 4 is a view in elevation and in section diagrammatically illustrating the use of gel slices in frozen food packaging according to Example 6 below.

My invention has solved this problem. Figure 4 shows a package of frozen food prepared according to my invention. Gel may be prepared according to the formula of Example 5, frozen to about −10° F., and cut into slices about 3½ inches wide by 5 inches long by ½ inch thick. Each slice 10 will fit into a standard frozen food package 11. If the same net weight of food 12 is to be packaged, the package 11 will be about ½ inch taller than where my invention is not employed. The food 12 (e. g. frozen peas) may be placed in the bottom of the container 11, a thin piece of wax paper 13 placed over the food, and the slice 10 of my gel refrigerant placed over that. The container 11 may then be closed. About two dozen containers 11 may be packaged into a corrugated container, as in current practice.

It takes about 108 B. t. u. to heat each pound of the gel of Example 5 from about −6° F. to about 16° F., approximately 90% being expended in the "heat of fusion" at about −6° F. The gel slice 10 of the dimensions described weighs about half a pound; so it will take about 54 B. t. u. to heat it over this range.

Let us suppose that this particular food 12 will be damaged if, and only if, its temperature exceeds 16° F. at any time and that fluctuation below this temperature will not hurt it. Such is the case with many frozen foods. Before the temperature can get above 16° F., the slice 10 of gel will have to absorb 54 B. t. u., and in each case of two dozen packages 11, the gel will have to absorb about 1296 B. t. u. before the food can be damaged. Moreover, because of the fact that the case will be resubjected to low temperatures after each handling, it can absorb 1296 B. t. u. each time it is handled without damaging the food 12. For example, the case of gel and frozen food is subjected to temperatures above 16° F. while it is removed from storage and placed in a railroad refrigerator car. However, after the car has been loaded and is closed, the refrigerator system freezes the gel again. When the car is unloaded and the case moved to a warehouse the gel protects the food until the case is again in a low-temperature storage chamber. This may happen repeatedly, every point of handling being followed by cold storage and recooling of the gel. In each instance 90% of the gel's B. t. u. value could be first taken on and then given off at −6° F. The gel is not damaged by being heated and refrozen, and the food is protected. Should this fluctuation happen seven times during the handling of the case, between the factory and the retail store, then the gel would have protected the commodity by absorbing a total of about 9072 B. t. u. This is equivalent to what about 63 pounds of water ice absorbs while melting and it is done by only 12 pounds of gel. Furthermore, water ice could not be used, because it would melt and run off.

*Example 7.—Protecting fish from heat and from dehydration during freezing*

The gel may be used to cool commodities quickly, keep them cool in transit, and at the same time prevent them from becoming dehydrated. This will be illustrated by describing a process for preparing fish.

Figure 5:
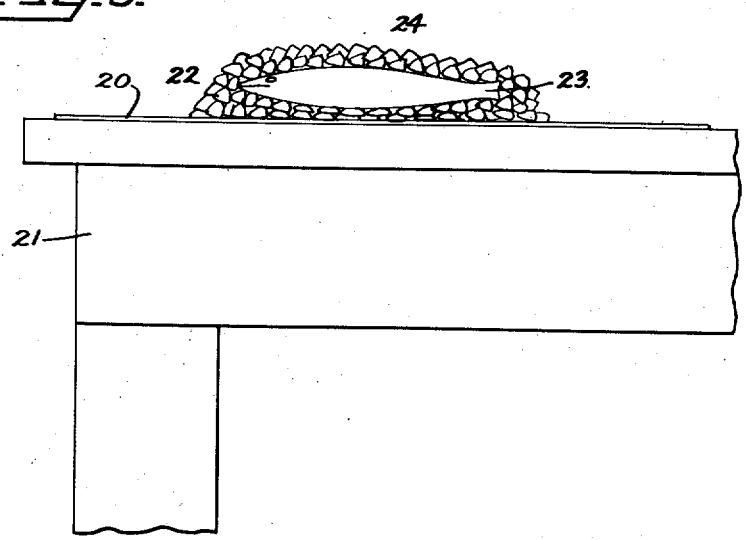
Fig. 5 is a view in elevation illustrating the packing of fish in accordance with Example 7 below.

Gel, which may be made according to the formulas in Examples 1 or 4, is frozen, cut into chunks, and ground into small pieces. Referring to Fig. 5, a suitable piece of wrapping paper 20 is placed on a table 21 and a one-inch thick layer 22 of the ground frozen gel is placed on the paper 20, over an area larger than the fish. The fish 23 is placed on this bottom layer 22, and more ground frozen gel 24 is packed around and over the fresh fish 23. Care is taken to cover the fish completely, but the largest amount of frozen gel is preferably placed on the top layer 24, because heat tends to rise. If desired, the open cavities of the fish may also be filled with the frozen gel. The fish may now be wrapped and the package placed in a corrugated box for shipment, along with other similar packages. An important point is that a corrugated box may be used with my gel ice, while it could not be used with water ice. Moreover, the coagulum stays properly packed in place from the minute it is packed until it is removed.

The gel will quickly lower the temperature of the fish, and it will protect it until the gel is heated to the critical high temperature of the fish, which is about 50° F. The gel absorbs heat not only at its "point of fusion" of the water, but also at temperatures above and below that.

My gel refrigerant also prevents the fish from dehydrating because the high-water-content coagulum surrounds the fish.

*Example 8.—Freezing fish*

My new gel or coagulum may be used to freeze fish, protect them from freezer burn during later cold storage, keep them frozen in transit and at the same time protect them from dehydration even after the whole mass has completely thawed.

The gel formula set forth in Example 5 may be used. After the coagulum has been frozen, cut into pieces and ground, it is applied in the same manner as in Example 7, but this time the wrapped fish is not placed immediately in the shipping container but is first placed in a quick freezer and allowed to remain there until the whole package is well-frozen. If the package is placed on freezer plates, the coagulum starts to freeze the fish from the top while the cold plates freeze it from the bottom; then after the fish and gel are at the same temperature level, the gel which absorbed heat from the fish will be refrozen. The fish cannot suffer "freezer burn" during this operation because it is covered with the moist gel. Moreover the package may be retained in a cold storage room for a considerable time without suffering either freezer burn or dehydration. The gel of Example 5 allows the package to be held in cold storage at −10° F.

The frozen package may be packed and shipped in a corrugated paper container. It will be kept frozen until the coagulum has absorbed its heat of fusion, and during all this time it will protect the fish from dehydration.

*Example 9.—Another example of freezing fish*

Here gel made according to the formula set forth in Example 5 will again be used. Sodium chloride is used to keep the gel from freezing above −6° F. because in the method about to be set forth, the gel is not to interfere with the quick freezing of the fish. The procedure of this example protects the fish from dehydration and from unfavorable temperatures; it also saves time and eliminates a number of operations, reducing the cost and requiring less equipment.

The unfrozen gel at about room temperature is placed near the packing table 21 (Fig. 5). A suitable piece of paper 20 is placed on the packing table 21. A layer or slice 22 of unfrozen gel is placed on the paper, the fish 23 placed on it, and then more of the unfrozen gel 24 is molded around it. The paper is then folded over and taped or tied, and the package is placed in the quick freezer. Then the temperature is lowered below the freezing point of the fish, but at a point above the freezing point of the gel. When the package is placed on refrigerator coils or between, the gel helps to conduct the heat from the fish to the coils better than air does. After the fish has been frozen, the gel may be left unfrozen or it may be frozen, if desired, and no freezer burn or dehydration can take place. When the package is completely solid, it may be removed, packed, and shipped. Because the coagulum was not frozen in advance, there was less labor and no cutting or grinding equipment was needed.

The above examples could be multiplied many times, but they are already sufficient to illustrate the principles of the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process for making a cold-water gel capable of being frozen and thawed without losing its water, comprising intimately mixing 100 parts of dry pregelatinized starch with between 13 and 100 parts of dry powdered borax, and adding the dry mixture to between 300 and 1000 parts of water at room temperature in a steady stream while agitating the water.

2. The process of claim 1, wherein between 1 and 100 parts of dry paraformaldehyde is mixed with said dry powder before adding the powder to the water, and in which the borax may lie between 3 and 100 parts and the water between 300 and 1200 parts.

3. A method for manufacturing a gel refrigerant, capable of holding water without leaking, comprising, dissolving between 13 and 100 parts of borax in between 300 and 1000 parts of water at room temperature, and then adding 100 parts of pregelatinized starch, the mixture gelling on admixture of the parts.

4. The method of claim 3 in which between 1 and 100 parts of paraformaldehyde is dissolved in the water before the starch is added, in which the borax may be between 3 and 100 parts and the water between 300 and 1200 parts.

References Cited in the file of this patent

UNITED STATES PATENTS

| | | |
|---|---|---|
| 1,985,631 | Davidson et al. | Dec. 25, 1934 |
| 2,171,796 | Kelling | Sept. 5, 1939 |
| 2,466,369 | Bunderson | Apr. 5, 1949 |
| 2,490,047 | Gilchrist et al. | Dec. 6, 1949 |